United States Patent
Gennep

[11] Patent Number: 5,833,191
[45] Date of Patent: Nov. 10, 1998

[54] ADJUSTABLE HOLDER

[76] Inventor: Jan Van Gennep, 715 Laurel Ave., Menlo Park, Calif. 94025

[21] Appl. No.: 798,276

[22] Filed: Feb. 14, 1997

[51] Int. Cl.⁶ .................................................. A47F 5/00
[52] U.S. Cl. ............................... 248/288.51; 248/316.4; 269/71; 403/103; 403/389
[58] Field of Search .................. 248/288.31, 288.51, 248/229.12, 229.14, 229.22, 229.24, 316.4, 316.6; 403/389, 59, 103; 81/487; 269/71, 74, 76, 95, 104

[56] References Cited

U.S. PATENT DOCUMENTS

| | | | |
|---|---|---|---|
| 1,141,152 | 6/1915 | Stahl | 362/396 X |
| 1,562,994 | 11/1925 | Stewart | 362/396 X |
| 1,688,148 | 10/1928 | Martin | 248/288.31 X |
| 1,777,003 | 9/1930 | Kollath | 248/288.51 X |
| 2,287,485 | 6/1942 | Pierce | 248/231.5 X |
| 3,111,296 | 11/1963 | Ludes | 248/231.5 X |
| 4,119,305 | 10/1978 | Anderson | 269/71 |
| 5,441,225 | 8/1995 | Hall | 248/288.51 X |
| 5,547,305 | 8/1996 | Treche | 403/103 X |
| 5,573,329 | 11/1996 | Van Gennep | 248/288.31 X |
| 5,664,750 | 9/1997 | Cohen | 248/288.31 X |

*Primary Examiner*—Ramon O. Ramirez
*Attorney, Agent, or Firm*—Julian Caplan Flehr Hohbach Test Albritton & Herbert LLP.

[57] ABSTRACT

A holder for various different objects is described, which holder cooperates with a gripping device of the vise-grip type in which the position at which a pair of jaws lock relative to one another is adjustable. The holder includes a simple orientation change mechanism configured to enable a user to change the orientation of a special connector designed to hold differing objects. The connector includes a pair of jaws having concave facing gripping surfaces. A resistance varying structure is included to enable the user to vary the resistance to orientation change that might be expected from the different weight of objects. Thus, the holder is quite versatile with respect to the type of object that can be held by the same, which versatility is added to the versatility of the vise-grip type pliers with which it is designed to be used.

14 Claims, 2 Drawing Sheets

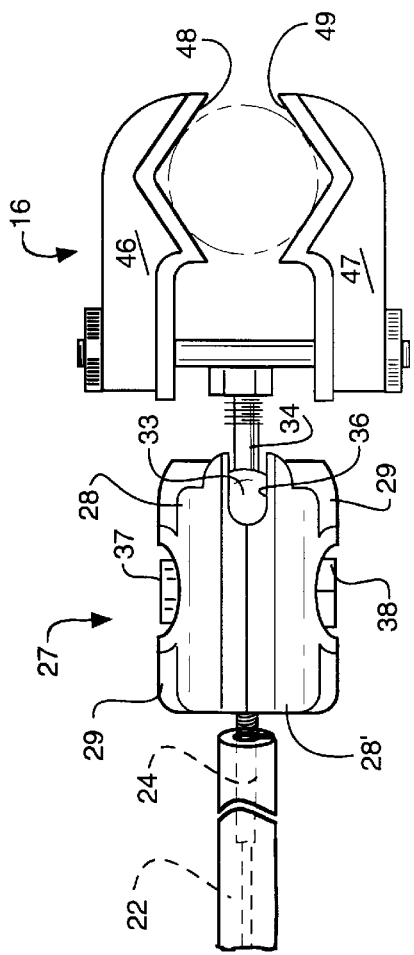
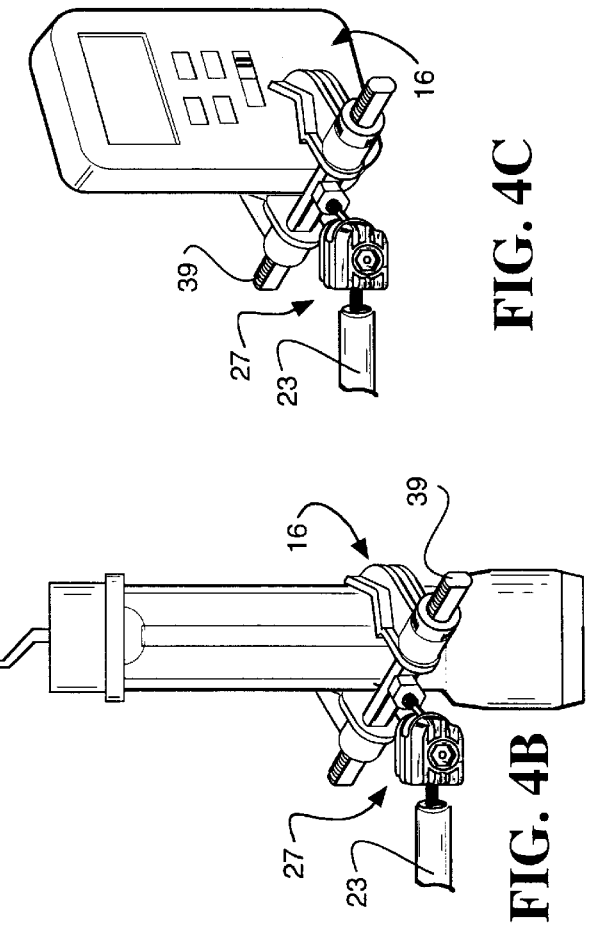
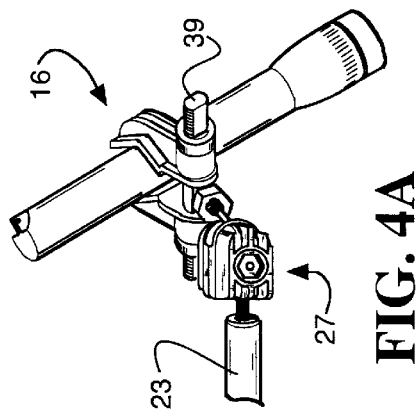

ADJUSTABLE HOLDER

BACKGROUND OF THE INVENTION

The present invention relates to a holder capable of stably holding any selected one of numerous different objects and, more particularly, to a holder which cooperates with a gripping device of the type in which the position at which a pair of jaws lock relative to one another is adjustable so that such gripping device has the capability of locking on differing structures.

It is often desirable to hold a tool or other object at a location without the use of the manipulator's hands. Applicant's earlier U.S. Pat. No. 5,573,329 describes a holder designed to operate with vise-grip type pliers, i.e., a gripping device of the type in which the position at which a pair of jaws lock relative to one another is adjustable. One advantage of this type of gripping device is that it can lock on many differing structures—gripping devices of this nature are very versatile.

SUMMARY OF THE INVENTION

The present invention takes advantage of the versatility of gripping devices of the type discussed above to hold any selected one of a plurality of objects at a desired location. That is, it adds significant versatility to the kind of object which can be held—it accomplishes this in a quite simple manner.

The invention includes an interface unit having a protrusion for securance to vise-grip type gripping devices. In more detail, most gripping devices of this nature have a bolt or the like which projects from a handle to facilitate a user changing the locking position of the jaws. A user or, in other words, a manipulator simply can rotate the bolt to provide the change. In a preferred arrangement a protrusion is provided by the interface unit, which protrusion simply is a bolt usable as a replacement for the adjustment bolt typically provided as part of a vise-grip type of gripping device.

The holder of the invention further includes an orientation change mechanism configured to enable a manipulator (user) to change the orientation of the connector and, hence, any object which is held by the same, relative to the gripping device. The inclusion of such an orientation change mechanism is particularly important for a holder designed to be used with a vise-grip type pliers because, among other reasons, the orientation of it frees a manipulator to place such pliers in any desired orientation—the orientation of the connector is not dependent on the orientation of the pliers.

The versatility of the holder of the invention is enhanced by including a resistance varying structure configured to vary the resistance to orientation change. A manipulator therefore can vary the resistance for an orientation change as appropriate, for example, to prevent a heavy object from changing the orientation because of the force of gravity. The orientation change mechanism simply is a ball and socket arrangement, and the resistance varying structure is a mechanism for changing the distance between housing members which define opposed cavities which, in turn, define the socket.

The connector incorporated into the preferred embodiment also enhances the versatility provided by the holder of the invention. Such connector includes a pair of jaws defining gripping surfaces which face one another, and an adjustment mechanism is associated with such jaws for changing the distance between the same to accommodate different objects to be held. Each of the facing jaw surfaces is concave relative to the other. This increases the range of different objects which can be held with the holder.

Other features and advantages of the invention either will become apparent or will be described in connection with the following, more detailed description of a preferred embodiment of the invention.

BRIEF DESCRIPTION OF THE DRAWING

With reference to the accompanying drawing:

FIG. 3 is a plan view of the holder of the preferred embodiment; and

FIGS. 4A, 4B and 4C are respectively isometric views; showing interaction of the holder with three different objects.

DETAILED DESCRIPTION OF THE PREFERRED EMBODIMENTS

Figure 1:
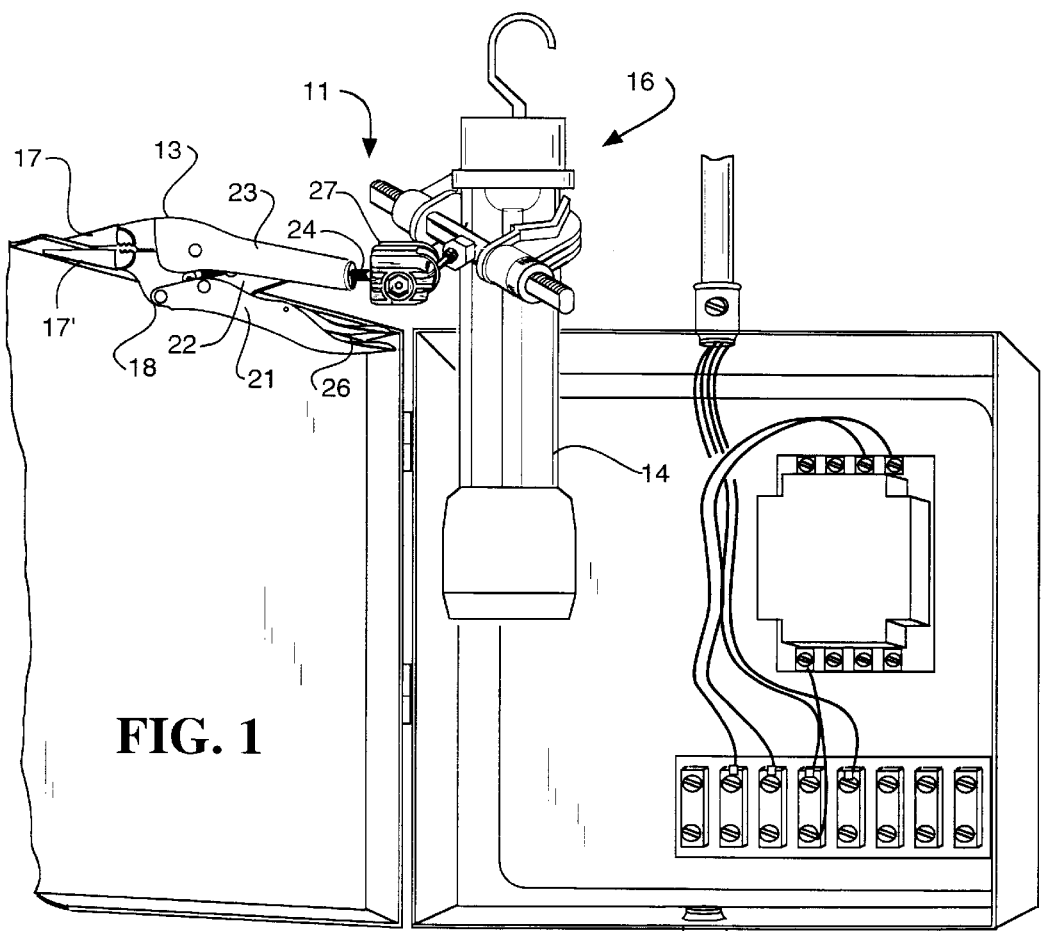
FIG. 1 is an isometric view illustrating a preferred embodiment of the invention maintaining a drop light in position for illuminating a desired location.

The following relatively detailed description is provided to satisfy the patent statutes. It will be appreciated by those skilled in the art, though, that various changes and modifications can be made without departing from the invention.

A preferred embodiment of a holder of the invention is generally referred to in the figures by the reference numeral 11, shown in combination with a gripping device in the form of standard vise-grip pliers 13. The holder 11 holds in position as indicated a drop light 14. More particularly, the holder includes a connector 16 which grasps such drop light. As will be seen in more detail from the discussion below, the drop light 14 is a selected one of a plurality of different objects with which the invention can be used.

Vise-grip pliers 13 are conventional and include a pair of opposing jaws 17 and 17' and a handle 18. (Such jaws may be covered as is illustrated.) As is common, the handle 18 includes a manipulatable hand trigger portion 21 which is suitably connected to lock the plier jaws 17 and 17' with an over-center operation in a desired set position relative to one another.

The distance between the plier jaws 17 at which manipulation of handle trigger portion 21 provides locking, can be adjusted in a standard way. In this connection, a lever 22 pivotally connected to trigger 21 extends into the "stationary" handle portion 23. The end of the lever 22 within handle portion 23 bears against the end of the shank 24 of a bolt 25 threaded into the handle portion. In accordance with common arrangements of this nature, the location of the end of the bolt shank in the handle and, hence, the end of the lever 22, determines the positioning of the plier jaws 17 and 17' relative to one another when the vise-grip pliers are placed in a locked (handle 21 is placed in an over-center position) and set position.

It will be seen from the above that it is rotation of the bolt 25 which changes the location at which the vise-grip plier jaws become locked in position. In a preferred arrangement, the bolt which is provided by a manufacturer of vise-grip type pliers is replaced by a bolt which is included as part of the invention. The bolt 25 is such a replacement bolt. In one implementation of the invention, such bolt was designed to work with any vise-grip type pliers requiring a ¼ inch diameter bolt having 20 threads per inch. A release hand lever 26 is pivotally inn secured to the handle portion 21 in accordance with conventional practice to be depressed toward the handle portion 21 and engage the lever 22 with a lever action to aid in breaking an over-center lock.

It is particularly advantageous to use a vise-grip pliers type of gripping device. The jaws of this type of pliers are connectable to many different structural configurations. These include configurations that may not be grippable by other devices, i.e., those having minimum grippable surface areas. The use of a gripping device as represented by vise-grip pliers 13 as opposed to a spring clamp is also important for use of the invention to hold heavier objects.

Holder 11 includes an interface unit 27 having a protrusion in the form of bolt 25 mentioned previously. Such bolt 25 is the only point of connection between the pliers 13 and the holder. Threading movement of the shank 24 of bolt 25 within the vise-grip plier handle portion 23 is not obstructed by the remainder of the holder.

Figure 2:
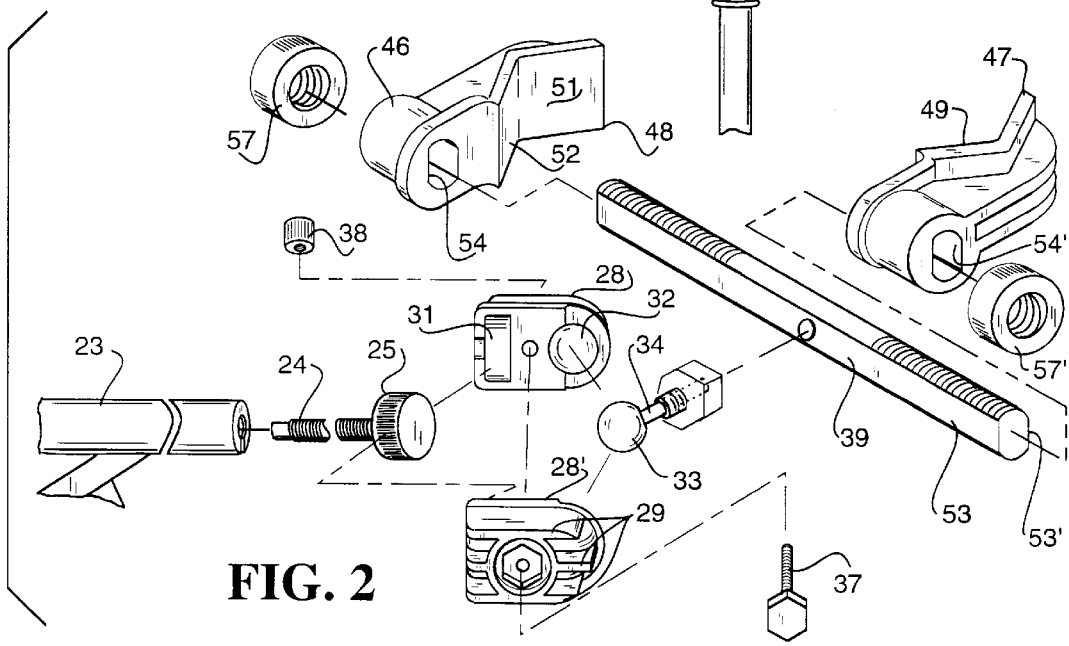
FIG. 2 is an exploded partial isometric view showing an holder of the embodiment of FIG. 1 and the manner in which it is securable to vise-grip pliers.

The interface unit includes a housing which, as is best illustrated in FIG. 2, is made up of two half parts 28 and 28'. In one implementation, such half parts are molded from a glass filled plastic. The exterior of each housing half includes a plurality of ribs 29 for strength purposes. Each also defines a first cavity 31 (only one of such first cavities being shown, it being recognized that the interior surfaces of the two housing halves are mirror images of one another) which cooperate when the halves are together to define a generally cylindrical cavity complementary to, and for receiving, the head of bolt 25.

The holder of the invention also includes orientation change mechanism. As part of this, each of the housing halves has another cavity 32 (again only one of which is shown). The cavities 32 in the two housing half parts cooperate to define a spherical socket of a ball and socket arrangement. That is, a ball 33 fits within such cavity, which ball has a rod 34 extending through a slot 36 (FIG. 3) in the housing. The axis of the slot 36 passes through the rotational center of the ball to enable a full 90° rotation of the rod relative to the axis of the shank 24 of the bolt. It will be seen that this 90° orientation change can be made over a full 360°. That is, the housing is rotatable relative to the bolt head. Thus, one can position the slot at any location in such 360°.

A bolt 37 extending through the two housing halves has a nut 38 at its end to hold the two housing halves together. As will be discussed in more detail hereinafter, such bolt and nut are, in essence, resistance varying structure which enable a manipulator to vary the resistance to orientation change provided by the ball ant socket arrangement.

As mentioned previously, the connector element of the invention includes a pair of jaws 46 and 47 defining opposed concave gripping surfaces 48 and 49. These opposed concave surfaces hold an object firmly between the same. It will be recognized that because of this concave nature, the jaw surfaces will hold many objects of different configurations. In fact, in many situations an adequate grip can be provided when only one of the gripping surfaces is concave.

Each of the gripping surfaces is simply and most desirably formed by a pair of intersecting surfaces 51,52 which are planar but reentrant relative to one another. The distance between such gripping surfaces is continuously variable. In this connection, both of the jaws 46 and 47 ride on the tie rod 39. Although the ends of such rod are threaded for a purpose which will be discussed below, the jaws 46 and 47 are slidable thereon in a manner which assures that the orientation of one relative to the other will be maintained. That is, as easily seen in FIG. 2, the rod 39 has a pair of opposed flat sides 53 and 53' which engage within corresponding flat portions in bores 54 and 54' in collar sections adjacent the end of each of the jaws. The dimension of each of these bores is slightly greater than the dimensions of the rod at such location so that each of the jaws will slide relative to the rod without interference because of the threads.

The interface unit further includes a pair of nuts 57 and 57' which threadably engage the threaded ends of the rod 39 and respectively act to inhibit or prevent movement of the respective jaws relative to the tie rod. They inhibit this movement in the direction opposed to the direction in which such jaws may be forced apart by an object to be held. Thus, they enable operation of the connector similar to that of a vise. In many situations it is only necessary that one of the jaws be moved, i.e., the location of only one of the nuts 57 and 57' need be moved. While the object then may not be held centrally of the adapter, it will be held quite adequately.

As mentioned previously, the interface unit of the combination is constructed to accommodate different objects. These objects generally will be of different weights. FIGS. 4A–4C show the holder of the invention holding different objects. FIG. 4A shows the holder holding a flashlight, FIG. 4B illustrates such holder holding a drop light of the type shown in FIG. 1, and FIG. 4C shows the holder holding an electrical ohmmeter. It will be recognized that these various objects have different weights. The user can adjust the friction of the orientation change mechanism to enable such different weights to be accommodated without a change in orientation. This simply can be done by the manipulator tightening, if necessary, the bolt 37 to change the distance between the housing halves 28 28' and, hence, the friction provided by the socket on the ball 33. It will be seen that tightening of this bolt also can be used to tighten the housing grip on the head of bolt 25 and thus prevent the weight of an object from simply causing rotation of the housing and a consequent orientation change. It will be seen that rotation of the bolt 37 changes the friction on both the bolt head and the ball simultaneously. This ability to provide adjustment of the two frictional resistances at the same time associated with orientation change simplifies the design.

As mentioned at the beginning of the detailed description, applicant is not limited to the specific embodiment described above. It is exemplary, rather than exhaustive. Various changes and modifications can be made. The claims, their equivalents and their equivalent language define the scope of protection.

What is claimed is:

1. A holder which cooperates with a gripping device, comprising:

A. an interface unit configured for securance to said gripping device;

B. a connector secured to said interface unit and projecting therefrom to hold a selected object;

C. an orientation change mechanism configured to enable a manipulator to change the orientation of said connector and, hence, any object held by the same, relative to said gripping device; and D. resistance varying structure configured to enable said manipulator to vary the resistance to orientation change providable by said orientation change mechanism, said orientation change mechanism including a pair of members which move relative to one another to provide such orientation change and said resistance varying structure being configured also to change the friction between such members, said members respectively being a ball and a socket with said ball being disposed within said socket for rotation therewithin, a housing including two parts defining opposing cavities which provide said socket, and said resistance varying structure being configured to change the distance between said parts at said cavities and, hence, change the resistance provided by said socket to rotation of said ball therein, said orientation change mechanism further including a rod extending from said ball, and said housing parts cooperating to define a slot through which said rod projects.

2. The holder of claim 1 wherein said resistance varying structure is a bolt extending between said parts.

3. A holder capable of holding any selected one of numerous different objects, which holder cooperates with a gripping device of the type in which the position at which a pair of jaws lock relative to one another is adjustable so that such gripping device has the capability of locking on differing structures, comprising:

A. an interface unit configured for securance to said gripping device; and

B. a connector configured to hold any selected one of numerous different objects, which connector projects from said interface unit and comprises:
1. a pair of jaws, each of which has a gripping surface facing the gripping surface of the other;
2. a mount for said jaws extending from said interface unit; and
3. an adjustment mechanism associated with said jaws for changing the distance between said facing gripping surfaces to enable said connector to grip tightly a selected one of said numerous different objects, said adjustment mechanism including:
A. a tie structure extending between said jaws; and
B. a limiting device on said tie structure engageable with one of said jaws for inhibiting movement of said jaw relative to said tie structure in at least one direction, said limiting device being adapted to continuously vary the position of said movement inhibition relative to said tie structure.

4. The holder of claim 3 wherein there are a pair of said limiting devices, each of which is respectively associated with a corresponding one of said pair of jaws.

5. The holder of claim 4 wherein said tie structure comprises a rod which is engageable by each of said jaws.

6. The holder of claim 5 wherein each of said jaws is slidably engageable with said rod, with the ends of said rod extending beyond said connector and being threaded, and each limiting device associated with a corresponding one of said jaws is a nut which threadably engages an end of said rod associated therewith and inhibits sliding of the corresponding jaw beyond the position of said nut.

7. The holder of claim 3 wherein the gripping surface provided by at least one of said pair of jaws is concave relative to the gripping surface provided by the other of said jaws.

8. The holder of claim 7 wherein the concave gripping surface provided by said jaw is defined by two intersecting planar surfaces.

9. The holder of claim 7 wherein the gripping surfaces provided by both of said jaws is concave relative to the gripping surface provided by the other.

10. The holder of claim 9 wherein the concave gripping surfaces of each of said jaws is defined by a pair of intersecting planar surfaces.

11. A holder which cooperates with a gripping device of the type in which the position at which a pair of jaws lock relative to one another is adjustable so that such gripping device has the capability of locking on differing structures, comprising:

A. an interface unit configured for securance to said gripping device;

B. a connector secured to said interface unit and projecting therefrom to hold a selected object;

C. an orientation change mechanism configured to enable a manipulator to change the orientation of said connector and, hence, any object held by the same, relative to said gripping device; and D. resistance varying structure configured to enable said manipulator to vary the resistance to orientation change providable by said orientation change mechanism, said connector including a pair of jaws defining opposed gripping surfaces for an object to be held, a mount for said jaws extending from said interface unit and an adjustment mechanism associated with said jaws for changing the distance between said facing gripping surfaces for said connector to tightly grip a selected one of numerous different objects.

12. A holder which cooperates with a gripping device of the type in which the position at which a pair of jaws lock relative to one another is adjustable so that such gripping device has the capability of locking on differing structures, comprising:

A an interface unit configured for securance to said gripping device;

B a connector secured to said interface unit and projecting therefrom to hold a selected object;

C an orientation change mechanism configured to enable a manipulator to change the orientation of said connector and, hence, any object held by the same, relative to said gripping device; and D. resistance varying structure configured to enable said manipulator to vary the resistance to orientation change providable by said orientation change mechanism,
said interface unit including a housing from which both a protrusion for securance to said gripping device and said orientation change mechanism project,
said protrusion being a bolt that is rotatable with respect to said gripping device.

13. The holder of claim 12 wherein said orientation change mechanism includes a pair of members which move relative to one another to provide such orientation change and said resistance varying structure is configured also to change the friction between such members.

14. The holder of claim 12 wherein said gripping device is vise-grip pliers and rotation of said bolt changes the location at which the jaws of such pliers are set relative to one another.

* * * * *